United States Patent [19]

Hodes et al.

[11] Patent Number: 5,093,207
[45] Date of Patent: Mar. 3, 1992

[54] LAMINATE MATERIAL OR LAMINATE WORKPIECE WITH A FUNCTIONAL LAYER, ESPECIALLY A FRICTION BEARING LAYER, DISPOSED ON A BACKING LAYER

[75] Inventors: Erich Hodes, Rossbach; Ulrich Engel, Bad Schwalbach, both of Fed. Rep. of Germany

[73] Assignee: Glyco Aktiengesellschaft, Wiesbaden, Fed. Rep. of Germany

[21] Appl. No.: 457,752

[22] PCT Filed: Apr. 14, 1988

[86] PCT No.: PCT/DE89/00227
§ 371 Date: Dec. 20, 1989
§ 102(e) Date: Dec. 20, 1989

[87] PCT Pub. No.: WO89/10433
PCT Pub. Date: Nov. 2, 1989

[30] Foreign Application Priority Data

Apr. 23, 1988 [DE] Fed. Rep. of Germany ..... P3813801.8

[51] Int. Cl.$^5$ ...................... C23C 26/02; F16C 33/14
[52] U.S. Cl. ..................... 428/614; 428/674; 148/1; 148/903; 266/113; 74/215; 219/121.37
[58] Field of Search ............ 148/1, 903; 266/113, 266/124; 204/29; 219/121.37; 74/214, 215; 428/614, 674

[56] References Cited

U.S. PATENT DOCUMENTS

| 4,153,477 | 5/1979 | Beyer et al. ............... 148/1 |
| 4,232,094 | 11/1980 | Rhodes et al. .............. 428/614 |
| 4,267,241 | 5/1981 | Mahrus et al. .............. 148/1 |
| 4,451,299 | 5/1984 | Smeggil et al. ............. 148/1 |
| 4,787,944 | 11/1988 | Monita et al. ............... 148/903 |
| 4,924,062 | 5/1990 | Zurcher ..................... 148/903 |

FOREIGN PATENT DOCUMENTS

| 2615022 | 7/1977 | Fed. Rep. of Germany . |
| 3635751 | 4/1987 | Fed. Rep. of Germany . |
| 526775 | 12/1922 | France . |
| 55-148752 | 11/1980 | Japan . |
| 57-9862 | 1/1982 | Japan ................ 148/1 |
| 60-59020 | 4/1985 | Japan ................ 148/1 |
| 62-170418 | 7/1987 | Japan ................ 148/1 |
| 62-207883 | 9/1987 | Japan . |

Primary Examiner—R. Dean
Assistant Examiner—George Wyszomierski
Attorney, Agent, or Firm—Herbert Dubno

[57] ABSTRACT

A laminate material of a laminate workpiece with a backing layer and a functional layer, in particular a friction bearing layer with the structure of a solid but fusible dispersion with a matrix and at least one component which is dispersed in the matrix and which at least in the solid condition is insoluble in the material of the matrix or is soluble only in an amount smaller than the amount present, or with the structure of a substantially fusible mixture, which is fixedly combined in itself and which can be used for tribological purposes, of components which are not soluble in each other or which are soluble in each other only in an amount smaller than the amount present, possibly partially in crystal-like form, is transformed into another structure in respect of the dispersion alloy or the mixture at the exposed surface of the functional layer by means of a surface treatment, more specifically by melting and very rapid cooling from the molten condition, so that fine distribution of the undissolved components occurs and the material of said surface region is frozen in said refined structure. The surface region may be of a thickness of between 20 μm and 500 μm, preferably between 50 μm and 100 μm. The structural transformation is produced by means of plasma flame in a closely delimited area on which the flame acts and which is progressively moved over the surface to be treated. The plasma flame or a plurality of juxtaposed plasma flames form a small molten bath which, as the plasma flame moves along relative to the laminate material or laminate workpiece, is immediately and very quickly cooled and solidified and thus frozen with a refined structure.

32 Claims, 2 Drawing Sheets

LAMINATE MATERIAL OR LAMINATE WORKPIECE WITH A FUNCTIONAL LAYER, ESPECIALLY A FRICTION BEARING LAYER, DISPOSED ON A BACKING LAYER

CROSS-REFERENCE TO RELATED APPLICATION

This is a national phase of PCT/DE 89/00227 filed Apr. 14, 1989 and based, in turn, upon German national application P 38 13 801.8 filed Apr. 23, 1988 under the International Convention.

FIELD OF THE INVENTION

Our present invention relates to a laminate material or a laminate workpiece comprising a functional layer which is disposed on a backing layer. More particularly, the invention relates to a friction-bearing layer with the structure of a solid but fusible dispersion with a matrix and at least one component which is dispersed in the matrix and which, at least in the solid state, is insoluble in the material of the matrix or is soluble only in an amount smaller than the amount present. The invention relates to a structure of a substantially fusible mixture which can be used for tribological purposes and which is a combination of components which are not soluble in each other or which are soluble in each other only in an amount smaller than the present, possible partly in a crystal-like form.

BACKGROUND OF THE INVENTION

Composite friction bearings or laminate materials for the production of composite friction bearings can be considered as laminate materials or laminate workpieces of a type in which the friction bearing layer representing the functional layer comprises a dispersion alloy, in particular lead-bronze or an aluminum/tin dispersion alloy or an aluminum/lead dispersion alloy, and is applied to a backing layer, primarily of steel, which forms a bearing shell. Composite bearings of laminate material of the steel/lead-bronze type are of particular significance because of their high dynamic load-carrying capacity and the good run-in and emergency-running properties of the lead bronze. Due to the total insolubility of the two metals in each other in the solid state, there is practically a mechanical mixture of copper and lead in the present functional layer consisting of lead bronze, that mixture being produced from the homogeneous molten material in the course of a long setting period. The steel/lead-bronze laminate materials which are conventionally used nowadays and which are produced by a strip coating process on steel are restricted to lead contents of up to about 22% by weight of the lead bronze. The difficulties in regard to manufacture of copper/lead alloys with lead contents within the miscibility gap, that is to say lead contents of between 40 to 50%, are so great that hitherto such alloys have not been of any practical significance. The bond between the steel backing member and the cast layer of lead bronze thereon is a strong metal bond between the steel backing member and the copper crystallites which are formed primarily by solidification from the molten material. Therefore, the formation of such copper crystallites must be utilized in the interest of achieving a good bond between the steel backing member and the lead bronze layer. In practice, that is achieved by an operation which provides that, for casting the lead/bronze thereon, the steel is raised to and held at a temperature of about 1100° C., which permits diffusion bonding between the steel and the copper crystallites. On the other hand, the structure of the lead-bronze functional layer, which is heterogeneous due to the copper crystallites and the lead precipitates, gives rise to serious functional disadvantages in comparison with a homogeneous functional layer structure. Comparable circumstances also arise in regard to friction bearing layers which represent the functional layer, consisting of aluminum/tin dispersion allows and aluminum/lead dispersion alloys, as well as all conceivable functional layers for tribological purposes with a heterogeneous structure, for example mixtures which are fixedly combined in themselves and which are substantially fusible, made of components which are not soluble in each other or which are soluble only in an amount which is smaller than the amount present.

German Open Application 29 37 108 already discloses a process for refining sliding alloys, in particular sliding or friction bearing alloys, in which the alloy is to be subjected to a local punctiform melting effect by one or more highly concentrated energy or heat beams, wherein due to the progressive movement of the punctiform surface portion which is subjected to the energy or heat beam and due to the dissipation of heat which occurs in the material of the functional layer, that process causes sudden cooling of the molten material. In that known process, however, the functional layer which is of a heterogeneous material structure is melted in the punctiform areas over its entire thickness, that is to say, as far as the region of bonding thereof to the backing layer. However, the amount of heat which is supplied in that operation is so great that the intended sudden cooling effect is so slow—not least because of the latent heat of fusion which is released again when the material resolidifies—that the reformation of a heterogeneous structure in the functional layer is inevitable. That procedure provides at best for a more or less slight refinement effect in comparison with the original structure. It is not possible in that way, to achieve a substantial improvement in the functional properties of friction bearing layers made of dispersion alloys and other mixtures which can be used for tribological purposes. In the case of functional layers of lead bronze, the desired diffusion bonding effect is eliminated or at least made substantially worse due to the fact that the functional layer is locally melted over its entire thickness.

It is known from EP 130 175 A2 and 130 176 A2, in relation to friction bearings, to form areas of different levels of hardness in the running surface, by a process which provides that hardening material components are fused into the surface region of the running surface, in delimited zones of the running surface, preferably utilizing laser beams or electron beams. That provides a bearing running surface in which the bearing layer has areas with different levels of hardness, but it does not provide a surface refinement effect which extends over the entire running surface, in the sense of improving the functional properties and, in particular, the tribological properties to the same degree at all parts and areas of the surface of the functional layer.

Finally, it is known from German Open Application 36 36 641 and EP 212 938 A2 to form sliding or friction bearing layers on a strip-like carrier, for example a steel backing member, by a procedure which provides that a mixture of the alloying components is first applied in a powder form to the backing member. The powder is then progressively locally melted, using an energy beam, namely, a laser beam, which is guided over the layer of powder in a predetermined pattern. Admittedly, it is possible for the layers produced in that way from a dispersion alloy to have a finer structure than that found in cast functional layers made from a dispersion alloy. However, it is also not possible in that way to produce functional properties which are comparable to a finely divided structure which is close to a homogeneous structure in respect of the functional layer. In addition, the fact that previously sprinkled powder is caused to melt progressively in a punctiform area means that the desired diffusion bonding effect between the backing layer and the functional layer cannot be attained.

OBJECTS OF THE INVENTION

It is an object of the present invention to improve laminate materials or laminate workpieces of the kind set forth above so that on the one hand, a securer bond—if possible from the point of view of the material involved, a diffusion bond—is guaranteed between the backing layer and the functional layer, while on the other hand, at its surface which performs the bearing or frictional function, the functional layer has a structure which enjoys functional properties which are substantially improved in comparison with functional layers with a conventional heterogeneous structure.

Another object is to provide a laminate material or laminate workpiece which can be produced in a process which can be reliably carried into effect without excessive expenditure in terms of time and equipment.

SUMMARY OF THE INVENTION

In the laminate material according to the invention and the laminate workpieces according to the invention, these objects are attained in that the functional layer, at the side thereof remote from the backing layer, has a thin surface region which is closed throughout and in which the dispersion or the mixture, by melting and extremely rapid cooling from the molten condition, has a structure which is refined in comparison with the rest of the functional layer, with a finely divided distribution of the undissolved components.

The invention is based on the realization that the actual functional layer, for example, the tribological effects of a sliding or friction bearing layer, take place in a very thin surface region of the functional layer. In accordance with the invention, therefore, a structure refinement effect to produce improved functional properties is restricted only to a thin surface region while over the major part of its thickness the functional layer is of a conventional crystalline or dispersion form. In that way, the functional layer can be primarily adapted to optimum bonding to a backing layer, in the region of the functional layer which is adjacent the backing layer. In addition, the capacity for the layers to be satisfactorily held together, the desired layer toughness and the pressure-carrying capability of the layer are determined by the structure in the middle region of the layer. For that purpose, the conventional crystalline structure or dispersion structure has been found to be satisfactory. In accordance with the invention, therefore, the functional layer is formed with regions of different structures. More specifically, the layer has the region produced upon first manufacture thereof by casting or similar processes with a crystalline structure or dispersion structure which embraces the bonding region and the middle region of the functional layer, and a fine structure which embraces a relatively thin surface region and which is adapted to the desired functional properties, for example with improved frictional characteristics, increased fatigue strength and similar properties. By virtue of the initially heterogeneous structure of the functional layer being transformed in accordance with the invention into a fine structure only in a thin surface region, the properties of a heterogeneous structure which are advantageous in regard to bonding of the functional layer to the backing layer, are put to optimum use. Likewise, the pressure-carrying capacity, toughness and internal cohesion of the functional layer are also advantageously influenced by the heterogeneous structure, possibly with the inclusion of crystalline particles. In accordance with the invention, therefore, there is provided a combination of a heterogeneous, possibly partially crystallized structure functional layer in its lower and middle regions and a fine structure in a thin surface region. By virtue of that combination of two regions of substantially different structures, which are closed throughout in a layer configuration, the functional layer can be adapted to practically any desired range of properties. The relationship in respect of thickness of the portion of the layer with a heterogeneous structure to the portion of the layer with a fine structure, due to additional inclusions therein, can be used as parameters in relation to the adaptation effect referred to above.

The surface region of the functional layer, which has a refined structure, may be of a thickness of between 50 $\mu$m and 500 $\mu$m. Generally, it is preferably for the surface region of the functional layer, which is provided with the fine structure, to be of substantially uniform thickness. It is, however, possible to envisage situations of use in which it appears to be more appropriate for the surface region of the functional layer, which is provided with a fine structure, to be of a locally varying thickness. For example, that aspect may be considered in relation to sliding or friction bearings which, in accordance with the use thereof, have a main loading region. It would be possible to consider the surface region which has the fine structure being of increased thickness in that main loading region.

In accordance with the invention, the functional layer may be formed from a dispersion or a mixture with a matrix or supporting component of the mixture, on the basis of one or more of the following metals: copper, aluminum, zinc and silver; and at least one component which is dispersed or included in some other manner, on the basis of one or more of the following substances in the form of fine particles: lead, tin, bismuth, indium, nickel, manganese, silicon, carbon (preferably in the form of graphite particles encased by metal such as nickel, aluminum or copper), molybdenum disulphide (preferably encased with metal such as nickel, aluminum or copper), boron nitride, and plastics materials which can be used for tribological purposes such as for example, polyester, PTFE, PEK and PEEK.

In accordance with the invention, one or more additives of the following group of substances in a total amount of up to 2% by weight, preferably up to 0.5% by weight, may be alloyed to the metal components of the mixture or dispersion forming the functional layer: Li, Na, Ca, Ba, Bi, Si, P, As, Sb, S, Se, Te, Zn, Ti, Zr, Ce, Cr, Mn, Fe, Co, Ni, Si+Zr and Si+Zr+S. As is known, these additives produce a structure refining effect. It was found, however, that the influence of the cooling conditions predominates over the influence of such additives. Al the same, the specified additives have the advantage, in accordance with the invention, that upon the transformation of structure in the surface region of the functional layer by melting and extremely rapid cooling from the molten condition, the attainment of a finer distribution of the undissolved components and the attainment of the refined structure which the invention seeks to achieve is also facilitated and ensured.

For use for tribological purposes, in particular in the case of sliding or friction bearings, the functional layer which in such a case is the sliding or friction bearing layer can preferably be formed from lead bronze, preferably of the composition CuPb22Sn, or lead tin bronze. In such functional layers or bearing layers of lead bronze and lead tin bronze, the invention can be used to particular advantage because therein the dendritic structure of the lead bronze or the lead tin bronze is eliminated by melting and immediately following rapid cooling in a thin surface region which is closed throughout in the form of a layer, and the lead bronze or lead tin bronze receives a structure which is substantially refined in comparison with the originally dendritic structure and is so-to-speak frozen in that refined structure affords substantially improved sliding or friction properties, in particular in relation to the tribological partner steel.

Similar advantages are enjoyed when the invention is used in relation to tribological elements in which the functional layer, more specifically in this case, the sliding or friction layer thereof, is formed from aluminum/tin dispersion alloy, for example AlSn6CuNi, AlSn-20Cu or AlSn40Cu. In view of the immiscibility of aluminum and tin, such dispersion alloys with an aluminum matrix cannot be cast as a functional or a sliding or friction layer, other than by a procedure providing that, when solidification occurs, there is phase separation between the aluminum and the tin and particles of separated out tin alloy are included in the aluminum matrix. In the surface region, which is formed in accordance with the invention, of such a functional layer or bearing layer, those tin alloy particles are then distributed, forming a refined structure, in substantially finer particles than the original layer formed by solidification from the molten material, in the matrix consisting of pure aluminum alloy. In accordance with the invention, in such functional layers or friction of aluminum/tin dispersion alloy, a surface region is "frozen" in a refined structure. In that case, the surface region also provides considerably improved sliding properties.

Similar conditions may be achieved in functional layers of aluminum/lead dispersion alloy, for example AlPb8Si4SnCu by virtue of the surface region which is "frozen" in accordance with the invention in a refined-structure condition. Such functional layers are preferably also used as a sliding or friction bearing layer in tribological elements.

In a particularly advantageous development of the invention, hard particles from the group consisting of TiC, glass powder, $Si_3N_4$, WC, SiC and $Al_2O_3$ may be subsequently included in the surface region, which is of a refined structure, of the functional layer. Such a development of the invention may also provided that hard particles on the basis of Laves phases ($AB_2$), preferably of the type $MgCu_2$ or type $MgZn_2$, $MgNi_2$, are subsequently included in the functional layer surface region which has a refined structure, wherein the relationship with respect to radius of the A-atoms and the B-atoms is as follows:

$r_A/r_b = 1.225$.

Those hard particles which are subsequently included in the surface region of the functional layer permit the functional characteristics of the functional layer to b further improved in that surface region and in particular, also permit them to be adapted to any desired function in an improved fashion. For example, the resistance to abrasion in the case of sliding or friction bearing layers forming the functional layer can be improved and adapted to the respective nature of the tribological partner, for example steel crankshafts produced by a die-casting operation and the like.

In another advantageous development of the invention, it its surface region which has a refined structure, the functional layer is initially covered with a soft metal overlay of a thickness of between 10 $\mu$m and 500 $\mu$m, preferably from 12 $\mu$m to 24 $\mu$m. When the functional layer is in the form of a run-in-layer. It is possible for the overlay to be in the form of a galvanically applied layer comprising one of the following alloys: PbSn, PbSnCu, SnSb, PbSnSb and PbIn. In a tribological use as a run-in layer, such an overlay affords a particularly advantageous functional cooperation with the surface region of the sliding or friction bearing layer, which is "frozen" in the condition of a refined structure. As a soft overlay of that kind also fills up very slight irregularities and porosities at the surface of the surface region which has the refined structure and the soft material of the overlay acts in the manner of a solid lubricant in relation to the surface region of the functional or bearing layer, which has the refined structure. Depending on the composition of the material of the functional layer or bearing layer and the overlay, a diffusion barrier layer of a thickness of between about 2 $\mu$m and 10 $\mu$m may be provided between the overlay and the functional layer, wherein the diffusion barrier layer can, in turn, be adapted in respect of its material composition to the material composition of the overlay and the functional layer or bearing layer and can be formed from one of the materials CuSn, CuZn, NiSn, NiCr, NiCo, Co, Ti and Ni.

For production of laminate material according to the invention, or laminate workpieces according to the invention, it is possible to use a process in which the functional layer is formed from a fusible dispersion or from a fusible mixture which can be used for tribological purposes, by casting, spraying or by powder metallurgy, on the backing layer, and possibly compacted. In accordance with the invention, taking such a process as the basic starting point, the solid functional layer which is cooled but which is still exposed with its surface at the side remote from the backing layer is heated at said exposed surface in a defined surface area which is progressively moved over the entire surface by means of at least one plasma flame until melting of the dispersion or the mixture occurs in a surface region, to a depth of between about 50 $\mu$m and 500 $\mu$m, and is immediately cooled again at a cooling rate of at least $10^2$ K/s, with solidification and freezing of the refined structure formed in the melting operation in the surface region.

In that process, the surface of the functional layer which is formed by casting, spraying or by powder metallurgy and which has a heterogeneous structure of one kind or the other is scanned or raked with at least one plasma flame. In that operation, in a respective closely delimited surface area, the plasma flame or flames, with a high heating rate, produces a steep temperature gradient between the small heated and fused volume of material of the closely delimited surface area, and the remainder of the laminate material As the plasma flame is moved along, the amount of heat absorbed in the closely delimited surface area is conducted into the interior of the laminate material and, when that happens, the critical cooling rate required to produce a refined structure in the edge region adjacent the surface is exceeded. That process can be carried into effect in a relatively simple fashion and with a plasma flame feed speed which is advantageous in regard to a practical situation, in relation to the laminate material or workpiece to be treated.

The operation of melting the exposed surface region of the functional layer with plasma flame can be carried out in an air atmosphere. If the functional layer to be treated in the surface region includes material components which in a molten condition, have a tendency to react strongly with components of the air atmosphere, in particular the oxygen in the air, then the operation of melting the exposed surface region of the functional layer can also be carried out, without an excessive rise in cost by means of a plasma flame which is enclosed with inert gas, preferably argon. In any event, it is recommended that the operation of melting the exposed surface region of the functional layer is performed by means of such a plasma flame in which argon is used as the plasma gas. An improvement and a development in that process can provide that the operation of melting the exposed surface region of the functional layer is performed by means of a plasma flame, using an electric arc which extends in the plasma flame from the plasma torch to the surface of the functional layer. Such a plasma flame with an electric arc therein causes especially rapid heating and melting of the respective small area in the exposed surface of the functional layer and thus offers not just the possibility of a relatively rapid feed movement of the plasma flame with respect to the laminate material to be treated and thus permits the process to be carried out relatively rapidly, but it also provides for the formation of a very high temperature gradient between the melted area in the surface region and the surrounding regions and parts of the functional layer. The result of that very high temperature gradient is that the surrounding material is still relatively cool in the immediate vicinity of the small melted area of the surface region. Cooling and solidification of the small, closely delimited molten bath formed in the treated area then occurs immediately as the plasma flame moves on.

To provide for a further development in its improvement, the process according to the invention, may be combined with the step of particle injection into the treated surface region. For that purpose, fine hard particles of a size of between about 10 μm and 100 μm, preferably between 40 μm and 70 μm, can be injected into the surface region which is melted by the plasma flame of the functional layer. In that operation, the hard particles which are to be injected into the melted surface region may be introduced into the plasma flame itself if they are not caused to melt or are adversely affected in some other way by the plasma flame.

Particle injection using hard particles on the basis of Laves phases of type $AB_2$, preferably with a relationship with respect to the radius of the A-atoms and the B-atoms of:

$$r_A/r_B = 1.225$$

for example Laves phases of type $MgCu_2$ or type $MgZn_2$, $MgNi_2$, is also of particular advantage. The injection of hard particles based on Laves phases has proved itself to be extremely effective, particularly for the treatment of bearing materials and bearing workpieces. In the process according to the invention, the injection of such hard particles based on Laves phases is preferably effected separately from the plasma flame.

If it is desired for an overlay to be provided on the functional layer, in the process according to the invention, the overlay is applied under temperature conditions such as to prevent the frozen condition in the material of the surface region of the functional layer from being nullified. Preferably, therefore, the application of such an overlay is effected galvanically in accordance with the process of the invention. A similar approach applies to the formation of a diffusion barrier layer if such a layer is to be provided between the treated surface region of the functional layer and the overlay.

Particularly suitable for the production of laminate material according to the invention or laminate workpieces according to the invention is an apparatus in which at least one plasma flame nozzle is arranged opposite a carrier means for the laminate material or laminate workpieces to be treated, wherein the spacing of the plasma flame nozzle relative to the carrier means is adjustable, wherein moreover arranged directly downstream of the plasma flame torch, in relation to the relative direction of travel thereof is a cooling means which is directed towards the treated surface of the laminate material or the laminate workpieces fitted onto the carrier means. The apparatus according to the invention provides that the surface region of a laminate material or laminate workpieces, which is to be subjected to treatment, is entirely subjected to the action of one or more plasma flames precisely in accordance with a predetermined pattern and the distance of the plasma flame nozzle from the surface of the material or workpieces can be precisely adjusted so that the intensity of the action of the plasma flame and the depth of its action, on the surface region of the material or workpieces, can be precisely adjusted in order, on the one hand, to provide for mutual adaptation of optimum working conditions, desired depth of melting and optimum cooling conditions for the closely delimited molten bath which is produced in the surface region. That configuration ensures conditions for very rapid cooling by virtue of the cooling means which follows the plasma flame torch in the direction of travel thereof. In that arrangement, the cooling means may be in the form of a spray means for liquid coolant, for example a spray means for liquid nitrogen. In that arrangement, the cooling means may be provided at the top side with a screen which is extended to the treated surface of the laminate material or the laminated workpieces, at the peripheral edge of the screen, to form a hollow space.

In a preferred embodiment of the apparatus according to the invention, for the treatment of laminate material in strip form, a plurality of plasma flame nozzles are combined to provide a plasma flame torch which is in the form of a beam arrangement extending transversely over the strip of material to be treated. In that configuration, the carrier means for the laminate material in strip form may be designed for continuous transportation movement of the strip of material under the beam-like plasma flame torch. Such a carrier means is then also adjustable in regard to the speed of transportation movement of the strip of material.

BRIEF DESCRIPTION OF THE DRAWING

The above objects, features and advantages of our invention will become more readily apparent from the following description, reference being made to the accompanying drawing in which.

SPECIFIC DESCRIPTION

Figure 1:
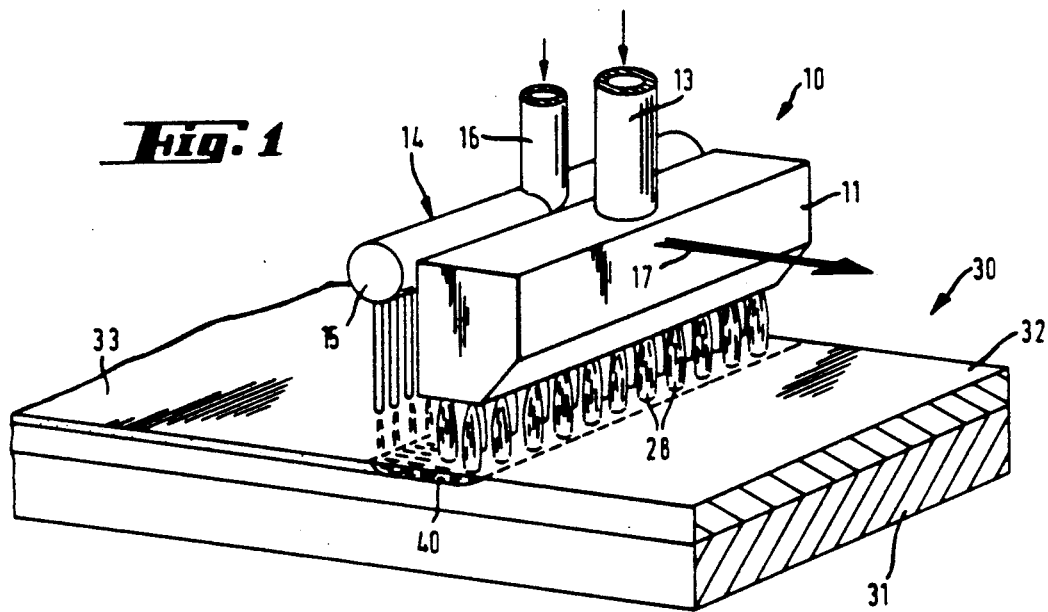
FIG. 1 is a diagrammatic perspective view of an apparatus for carrying out the process according to the invention.
Figure 2:
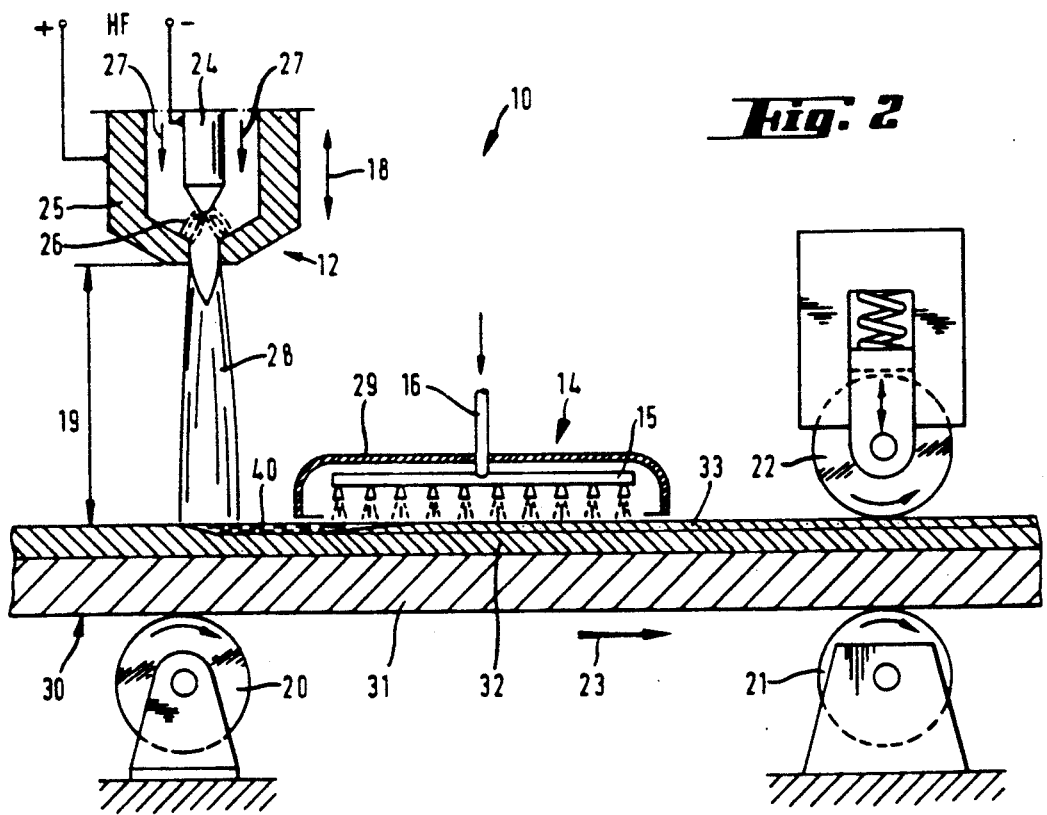
FIG. 2 is a diagrammatic view in vertical section of an apparatus according to the invention.

The apparatus 10 diagrammatically shown in FIGS. 1 and 2 comprises a plasma flame torch 11 including a plurality of plasma flame nozzles, of which only one plasma flame nozzle is diagrammatically shown in section at 12 in FIG. 2. The embodiments shown in FIGS. 1 and 2 serve for the treatment of a laminate material 30 in strip form. For that purpose, the plasma flame torch is of a tub-like configuration and extends over the width of the laminate material 30 in strip form.

As indicated in FIG. 1 the plasma flame torch 11 comprises two rows of plasma flame nozzles which are displaced relative to each other. The combustible gas is fed to the plasma flame torch 11 by way of a conduit 13. Arranged downstream of the plasma flame torch 11 is a cooling means 14 which is also in the configuration of a spray beam arrangement 15 extending transversely over the strip of laminate material. Cooling medium is fed to the spray beam arrangement 15 by way of the conduit 16.

The apparatus 10 formed by the combination of the plasma flame torch 11 and the cooling means 14 is moved in the direction indicated by the arrow 17 along the strip of laminate material 30. Instead of the laminate material 30 in strip form, portions of laminate material, for example for the production of tribological elements such as friction bearing shells or prepared plates or sheets could be arranged in a row, with the apparatus 10 passing thereover.

In the embodiment shown in FIG. 2, the treatment apparatus 10 is disposed in a stationary position, with the plasma flame nozzle 12 being displaceable in the direction indicated by the double-head arrow 18 at a spacing 19 relative to the free surface of the strip of laminate material 30. In this embodiment the laminate material 30 is passed over free-running support rollers 20 and driven support rollers 21, FIG. 2 showing only one free-running support roller 20 and one driven support roller 21.

Disposed opposite the driven support rollers 21 are pressure rollers 22 so that the strip of laminate material 30 is moved beneath the treatment apparatus 10 in the direction indicated by the arrow 23 at a uniform speed.

The plasma flame nozzle 12 has an inner electrode 24 which is at a high frequency potential relative to the actual nozzle housing 25 so that a high frequency ar 26 is maintained between the inner electrode 24 and the nozzle housing 25. Plasma ga is passed in the direction indicated by the arrows 27 through the plasma flame nozzle 12 and the ar 26 and thus forms the plasma flame 28. If the strip of laminate material 20 is also connected to high frequency potential, it is then also possible to maintain an arc which is extended from the electrode 24 by way of the nozzle housing 25 to the laminate material 30.

In this embodiment, the cooling means 14 is also in the form of a beam-like cooling spray means 15 to which the cooling medium is supplied by wa of the conduit 16. As indicated in FIG. 2, the cooling spray means 15 is provided at the top side with a screen 29 which at its peripheral edge is extended to the treated surface of the laminate material 30 to form a hollow space. In this embodiment, the cooling spray means 15 may preferably by fed with liquid nitrogen The provision of such a cooling spray means in the associated feed direction (arrow 17 in FIG. 1) of the treatment apparatus 10, with respect to the laminate material 30 to be treated, provides that the small amount of material which is melted with the plasma flame 28 is effectively quenched and that small amount of material is caused to freeze in a refined structure. In the embodiments shown in FIGS. 1 and 2, the laminate material 30 comprises a backing layer 31 of steel and a functional layer 32 of fusible dispersion alloy or fusible mixture of different components, wherein the components of the alloy or the mixture, at least in the solid condition, are not soluble in each other or are soluble only when in an amount smaller than the amount present. A closely delimited molten bath 40 is locally formed from components of the alloy or the mixture at the location at which the plasma flame 28 acts on the surface of the functional layer 32. The cooling spray means 15 then provides for instantaneous cooling and solidification of the molten bath 40. That instantaneous cooling and quenching operation provides that a considerably refined structure is formed and the workpiece is "frozen" in that refined structure. The continuous relative feed movement of the apparatus with respect to the laminate material 3 provides that a surface region 33 with "frozen" refined structure is formed on the free surface of the laminate material, over the entire surface of the functional layer 32.

The apparatus shown in FIGS. 1 and 2 and the process which can be carried into effect therewith may be used in relation to functional layers 32 of widely varying structures. It can preferably be used for the surface refining treatment of functional layers of lead bronze or lead tin bronze. It is also possible, however, to envisage the surface treatment of functional layers of aluminum/lead dispersion alloys. Generally, surface treatments of the specified kind can be considered for functional layers 32 of any fusible material. Hard particle injection may be effected in the course of the above-discussed treatment process. The hard particles may be of a size of between about 10 $\mu$m and 200 $\mu$m. Insofar as the hard particles to be introduced are non-fusible or are difficult to melt, that operation can be effected directly together with the plasma flame 28, by the hard particles being introduced into the plasma gas or into the plasma flame 28 downstream of the plasma flame nozzle 12 in the direction of flow of the gas. If hard particles based on Laves phases are to be introduced into the surface region 33 that can also be effected by means of separate injectors which inject the Laves phase hard particles into the molten bath 40 between the area in which the plasma flame 28 is operative and the cooling spray means 15. The depth of action of the plasma flame and therewith the thickness of the treated surface region can be adjusted by adjustment of the distance 19 of the plasma flame nozzle 12 from the surface of the laminate material 30.

Figure 3:
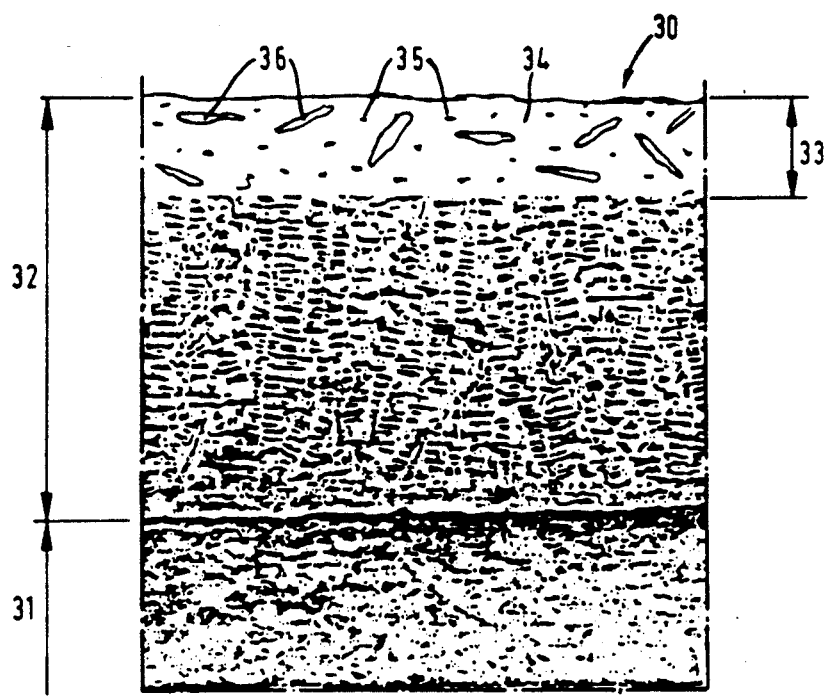
FIG. 3 is a drawing of a micrograph which shows a portion, in the nature of a polished section, of an embodiment of the laminate material according to the invention.
Figure 4:
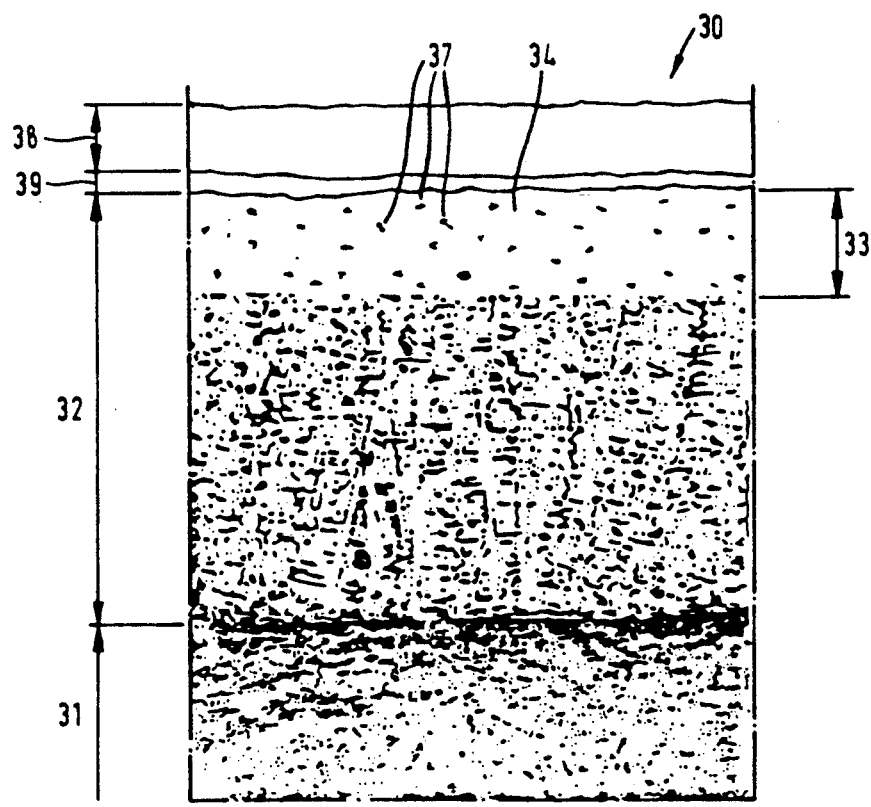
FIG. 4 is a similar view which shows a portion, in the nature of a polished section, of another embodiment of the laminate material according to the invention.

Examples of the surface refining treatment of functional layers of lead tin bronze and lead bronze are shown in FIGS. 3 and 4.

In the example of FIG. 3, the laminate material 30 is intended for the production of tribological elements, preferably friction bearings. The laminate material 30 comprises a backing layer 31 and a functional layer 32. In the illustrated example, the functional layer 32 comprises lead tin bronze of the following composition: 10% by weight lead, 10% by weight tin, with the balance copper. As FIG. 3 shows, when the lead tin bronze cools and solidifies, the functional layer 32 adopted a dendritic structure which is substantially governed by copper crystallites. A diffusion bond between the copper crystallites which appear dark in FIG. 3 and the steel occurs at the interface between the backing layer 31 consisting of steel and the functional layer 32. At its free surface, the functional layer 32 has been subjected to a surface treatment with plasma flame, as described above. In that way, the dendritic structure of the lead tin bronze was eliminated and a new refined structure was produced, which is characterized by a matrix 34 which is shown as white in the drawing, and finely divided undissolved particles 35 included in the matrix. In the surface treatment of the illustrated example, a hard particle injection operation using Laves phases was additionally effected, the hard particles 36 being substantially smaller than the thickness of the treated surface region 33 but incomparably larger than the finely divided particles 35 of the undissolved components. The matrix 34 and the undissolved components 35 finely distributed therein are frozen in a refined structure while the hard particles 36 are included in the frozen structure.

Besides a substantial improvement in functional properties, in particular the sliding properties, the surface region 33 formed by structural transformation, in conjunction with the backing layer 31, affords effective encapsulation of the part of the functional layer 32 which has remained of dendritic structure. As the particles 35 of lead tin alloy are practically sealingly enclosed in the surface region 33, the surface 33 is practically insensitive to corrosion of the lead, even if oils with large amounts of additives or old oils come into contact with the surface of the functional layer 32 in internal combustion engines. In the case of conventional functional layers of lead bronzes or lead tin bronzes, oils with large amounts of additives and old oils give rise to selective corrosion at the lead particles between the copper crystallites or the dendrites. That results in the lead component being selectively dissolved out, leaving the copper skeleton, which, when subjected to a corresponding loading, has a tendency to collapse. That danger is eliminated by the encapsulation of the part of the functional layer 32 which is still of a dendritic structure, between the surface region 33 with transformed structure and the backing layer 31, as long as the surface region 33 of the functional layer 32 is not worn away. Such wear is considerably delayed by the included hard particles 36.

The example shown in FIG. 4 also involves a laminate material 30 which is intended for the production of tribological elements, in particular friction bearings. The laminate material 30 shown in FIG. 4 comprises a backing layer 31 of steel and a functional layer or friction bearing layer 32 of lead bronze, for example of the composition CuPb22Sn. In that configuration, the tin is completely dissolved in the lead component and serves only to reduce the susceptibility to corrosion of the lead component. In this example also, the lead bronze of the functional layer 32 is of a dendritic structure. This functional layer 32 of lead bronze still suffers from a higher risk of corrosion, in comparison with a lead tin bronze functional layer, in regard to the lead particles which are contained in the copper dendrites.

At the initially free surface, the functional layer 32 is transformed in a surface region 33 which is, for example, 100 to 200 $\mu$m in thickness, by the above-described process, into a structure in which the substantial part of the lead component which is undissolved in the copper is distributed in the form of fine particles in a matrix 34, with only a few, very small, somewhat larger lead particles 37 remaining. That surface region 33 is so-to-speak "frozen with that refined structure.

In the example shown in FIG. 4, the functional layer 32 is also covered with an overlay 38 which serves as a run-in layer when the laminate material 30 is used for the production of friction bearings or other tribological elements. The overlay 38 may selectively comprise alloys such as PbSn, PbSnCu, SnSb, PbSnSb or PbIn and is applied galvanically. A diffusion barrier layer 39 which is about 5 $\mu$m in thickness is also disposed between the surface of the functional layer 32 and the overlay 38. In the illustrated embodiment, the diffusion barrier layer is formed galvanically from nickel chromium alloy. It was galvanically applied prior to the overlay to the surface of the functional layer 32 which is treated with plasma flame. Subsequently to the diffusion barrier layer 39, the overlay 38 was then applied galvanically to the diffusion barrier layer 39. The thickness of the overlay can be between 10 $\mu$m and 500 $\mu$m, the present example having an overlay which is about 200 $\mu$m in thickness. Besides the formation of the diffusion barrier layer from nickel chromium alloy, it is also possible to envisage using alloys such as CuSn, CuZn, NiSn, NiCo or substances such as Co, Ti or Ni to form the diffusion barrier layer.

We claim:

1. An apparatus for the production of a laminate material wherein at least one plasma flame nozzle of a plasma flame torch is arranged opposite a carrier means for a laminate material to be treated, wherein the spacing of the plasma flame nozzle relative to the carrier means is adjustable, and arranged directly downstream of the plasma flame torch, in relation to the relative direction of travel thereof, is a cooling means which is directed towards the treated surface of the laminate material on the carrier means.

2. Apparatus according to claim 1 wherein the cooling means is in the form of a spray means for liquid cooling medium.

3. Apparatus according to claim 2 wherein the cooling means is in the form of a spray means for liquid nitrogen and is provided at the top side with a shield which, at its peripheral edge, to form a hollow space, is extended to the treated surface of the laminate material.

4. Apparatus according to claim 1 wherein the plasma flame nozzle is mounted displaceably in a plane parallel to an effective supporting surface of the carrier means.

5. Apparatus according to claim 1 wherein for the treatment of laminate material in strip form, a plurality of plasma flame nozzles are combined together to provide a beam arrangement which extends transversely over the strip of material to be treated.

6. Apparatus according to claim 5 wherein the carrier means for the laminate material in strip form is designed for continuous transportation of the strip of material beneath the beam arrangement (11) formed by the plasma flame nozzles.

7. Apparatus according to claim 6 wherein the carrier means is adjustable in relation to the speed of transpiration movement of the strip of material.

8. A friction bearing laminate, comprising:
a metal substrate;
a friction bearing layer on said substrate constituted by a matrix containing crystal-like structures in a region adjacent said substrate bonding to said substrate and at least one component dispersed in said matrix and, at least in a solid state of said layer, which is insoluble in said matrix; and
a surface region of a thickness between 50 μm and 500 μm extending continuously over said bearing layer and refined therefrom having a finely divided distribution of said component and formed by a plasma flame melting of said region and immediate cooling at a rate of at least $10^2$ K/s to freeze said distribution in said surface region.

9. The laminate defined in claim 8 wherein the matrix of said layer is at least one metal selected from the group which consists of copper, aluminum, zinc and silver and said component is selected from the group which consists of fine particles of lead, tin, bismuth, indium, nickel, manganese, silicon, graphite particles encased with nickel, aluminum or copper, molybdenum disulphide, boron nitride, and tribological plastics selected from the group which consists of polyester, polytetrafluoroethylene, polyetherketone and polyether ether ketone.

10. The laminate defined in claim 9 wherein said layer contains up to 2% by weight of at least one alloyed substance selected from the group which consists of Li, Na, Ca, Ba, Bi, Si, P, As, Sb, S, Se, Te, Zn, Ti, Zr, Ce, Cr, Mn, Fe and Co.

11. The laminate defined in claim 9 wherein the layer is formed from an alloy, selected from the group which consists of lead bronze and lead tin bronze.

12. The laminate defined in claim 9 wherein the layer is formed from an alloy selected from the group which consists of AlSn6CuNi and AlSn4OCu.

13. The laminate defined in claim 9 wherein said layer is formed from AlPb8Si4SnCu.

14. The laminate defined in claim 9 wherein hard particles of a size of between about 10 μm and 100 μm are incorporated in the surface region.

15. The laminate defined in claim 14 wherein the hard particles are selected from the group which consists of TiC, glass powder, $Si_3N_4$, WC, SiC and $Al_2O_3$.

16. The laminate defined in claim 14 wherein the hard particles are Laves-phases ($AB_2$) particles wherein the ratio in respect of radius of the A-atoms and B-atoms is $r_A/r_B = 1.225$.

17. The laminate defined in claim 9, further comprising a soft metal overlay of a thickness of between 10 μm and 500 μm on said surface region.

18. The laminate defined in claim 17 wherein the overlay is in the form of a run-in layer.

19. The laminate defined in claim 17 wherein the overlay is a galvanically applied layer of an alloy selected from the group which consists of PbSn, PbSnCu, SnSb, PbSnSb and PbZn.

20. The laminate defined in claim 17, further comprising between the overlay and the friction bearing layer a diffusion barrier layer of a thickness between about 2 μm and 10 μm.

21. The laminate defined in claim 20 wherein the diffusion barrier layer is selected from the group which consists of CuSn, CuZn, NiSn, NiCr, NiCo, Co, Ti and Ni.

22. A process for the production of a friction bearing laminate which comprise the steps of:
(a) applying a friction bearing layer to a metal substrate, said friction bearing layer being constituted by a matrix containing crystal-like structures in a region adjacent said substrate bonding to said substrate and at least one component dispersed in said matrix and which is insoluble in said matrix at least in a solid state of said layer;
(b) treating a side of said friction bearing layer opposite said region and which is in a solid state by melting said layer to a depth of about 50 μm to 500 μm progressively over the entire surface of said layer; and
(c) immediately after melting and progressively over the entire surface cooling the melted material at a cooling rate of at least $10^2$ K/s to solidify and freeze a refined structure formed by melting in said surface region to a thickness of about 50 μm to 500 μm.

23. The process defined in claim 22 wherein the melting is effected with said plasma flame in an air atmosphere.

24. The process defined in claim 22 wherein the melting is effected with said plasma flame enclosed in argon.

25. The process defined in claim 22 wherein the melting is effected with said plasma flame having argon as a plasma gas.

26. The process defined in claim 22 wherein the melting is effected with said plasma flame having an electric arc extending the plasma flame from a plasma flame torch to said surface region of said layer.

27. The process defined in claim 22 further comprising injecting fine hard particles of a particle size between 10 μm and 100 μm into the melted surface region.

28. The process defined in claim 27 wherein said hard particles are introduced into the plasma flame and entrained thereby into the surface region.

29. The process defined in claim 28 wherein said hard particles are Laves phase $AB_2$ particles with a ratio of the atomic radii of A to B of 1.225.

30. The process defined in claim 27 wherein the hard particles are selected from the group which consists of TiC, WC, SiC, glass powder, $Si_3N_4$ and $Al_2O_3$.

31. The process defined in claim 22 further comprising the step of galvanically applying an overlay to said surface region.

32. The process defined in claim 31 further comprising the step of applying to said surface region, prior to the application of said overlay, a diffusion barrier layer of a thickness between 2 μm and 10 μm, said overlay having a thickness of 10 μm to 500 μm.

* * * * *